United States Patent [19]

Langer et al.

[11] Patent Number: 4,793,905
[45] Date of Patent: Dec. 27, 1988

[54] METHOD FOR PARTIALLY AND SELECTIVELY OXIDIZING ALCOHOLS TO ESTERS OR CARBOXYLIC ACIDS

[75] Inventors: Stanley H. Langer; Michael J. Foral; John C. Card, all of Madison, Wis.

[73] Assignee: Wisconsin Alumni Research Foundation, Madison, Wis.

[21] Appl. No.: 138,961

[22] Filed: Dec. 29, 1987

Related U.S. Application Data

[63] Continuation of Ser. No. 70,426, Jul. 7, 1987.

[51] Int. Cl.$^4$ .................................................. C25C 1/00
[52] U.S. Cl. ............................ 204/59 R; 204/DIG. 3
[58] Field of Search ........................ 204/DIG. 3, 59 R

[56] References Cited

U.S. PATENT DOCUMENTS 3,336,386  8/1967  Dovell et al. ..................... 260/576
4,656,147  4/1987  Iida et al. ........................... 502/26

OTHER PUBLICATIONS

Banholzer, W. F., et al, Surf. Sci. 128, 176 (1983).
Banholzer, W. F., et al, J. Catal. 85, 127 (1984).
Park et al, Surf. Sci. 155, 341 (1985).
Fischer, T. E., et al, J. Catal. 53, 24 (1978).
Gohndrone, J. M., et al, J. Catal. 53, 24 (1978).
Harris, P. J. F., Nature 323, 792-794 (1986).
Langer, S. H., et al, J. Electrochem. Soc. 122, 1619-1623 (1975).
Langer, S. H., et al, Ind. Eng. Chem. Proc. Des. Dev. 18, 567 (1979).
Langer, S. H., et al, Ind. Eng. Chem. Proc. Des. Dev. 22, 264-271 (1983).
Langer, S. H., et al, Pure and Appl. Chem. 58, 895-906 (1986).
Larry-Pitera, E., et al, Electrochim. Acta 30, 971 (1985).
Matsumoto et al, J.C.S. Faraday I, 76, 1116 (1980).
Pate, K. T., et al, Environ. Sci. Technol. 19, 371 (1985).
Pesselman, R. L., et al, Chem. Eng. Commun. 38, 265-273 (1985).
Shono, T., et al, Tetrahed, Letters 40, 3861-3864 (1979).
Loučka, T., J. Electroanal. Chem. 31, 319-332 (1971).
Schmidt, L. D., et al, J. Catalysis 22, 269-279 (1971).
Spotnitz, R. M., et al, Electrochim. Acta 28, 1053-1062 (1983).

Primary Examiner—R. L. Andrews

[57] ABSTRACT

A transition metal electrocatalyst surface (e.g. a porous surface of finely divided Group VIII or Group I-B metal with an attached current collector) is modified by a sulfur treatment, using an oxidized sulfur species of average sulfur oxidation state of about 4 or less, e.g. $SO_2$ dissolved in aqueous acid. Treatment of the transition metal with $SO_2$ or the like typically provides up to 100% coverage of the surface electrocatalyst sites with chemisorbed sulfur-containing species and perhaps sub-surface effects as well, but washing or other non-electrochemical techniques can remove 5-90% (e.g. 25-70%) of the chemisorbed $SO_2$ or the like from the surface, leaving substantially only a very strongly bound form of the sulfur-containing species. The strongly bound sulfur-containing species can then be reduced to form a highly beneficial, selectivity-improving pattern of sites containing reduced —S (e.g. sulfur or sulfide) on the electrocatalyst surface. Electrochemical synthesis cells can be constructed from a cathode and/or anode made form the S-treated electrocatalyst and used in highly selective syntheses of useful organic and inorganic compounds from various starting materials, e.g. by reduction of $O_2$ to $H_2O_2$, reduction of NO to $NH_2OH$, oxidation of $RCH_2OH$ to $RCOOCH_2R$ (R=lower alkyl, etc.), oxidation of RR'CHOH to RCOR' (R and R'=lower alkyl, etc.) or the like.

7 Claims, No Drawings

4,793,905

METHOD FOR PARTIALLY AND SELECTIVELY OXIDIZING ALCOHOLS TO ESTERS OR CARBOXYLIC ACIDS

This invention was made with United States Government support awarded by the National Sciences Foundation (NSF), grant nos. CHE-8115022 and AGR-DTD-07-11°-85. The United States Government has certain rights in this invention.

FIELD OF THE INVENTION

This application is a continuation of our copending application Ser. No. 070,426, filed July 7, 1987.

This invention relates to a method for modifying the electrochemical characteristics of the surface transition metal in an electrocatalyst material, so that many—but not all—of the available catalytic sites on the active surface of the electrocatalyst will be occupied by sulfur, a sulfur compound, or a sulfur ion in a relatively low oxidation state, (e.g. about 0 or less). An aspect of this invention relates to the use of this sulfur-treated electrocatalyst in an electrode or an electrochemical cell, e.g. to provide a catalytic surface useful in electrochemical syntheses such as the reduction of an oxide to a lower oxidation state or the partial oxidation of an organic compound to an oxidation state of the C-atoms greater than 0 but less than +4. Still another aspect of this invention relates to a treatment for an electrocatalyst which provides the electrocatalyst with enhanced selectivity in the context of electrochemical syntheses.

THE PRIOR ART BACKGROUND

In recent years, electrochemical syntheses have been attracting increased attention from the chemical synthesis industry. Many starting materials behave in a unique manner when placed in an electrochemical environment, and hence there are valuable organic and inorganic compounds which can be produced in a relatively simpler and more convenient manner by electrochemical means as compared to conventional chemical means. For example, the conventional chemical synthesis of aldehydes and ketones from alcohols may require substantially anhydrous starting materials and elevated temperature or pressure conditions, whereas an electricity-producing electrochemical (i.e. "electrogenerative") conversion of ethanol to acetaldehyde can be carried out at very modest temperatures (e.g. 25°-90° C.) and pressures (e.g. atmospheric pressure) and with substantial amounts of water present in the alcohol feed material. See, for example, Langer et al, Pure & Appl. Chem. 58, 895, 902-905 (1986).

As will be apparent from the patent and scientific literature relating to electrochemical syntheses, there are at least three modes in which these syntheses can be carried out. The first mode could be called "electrolytic" and is by far the most commonly used. Typical examples of electrolytic syntheses include the manufacture of chlorine and sodium hydroxide from brine, the manufacture of adiponitrile or ethylene glycol by reductive dimerization, and all of the myriad forms of electroplating. Favorable thermodynamics are not required for this mode of electrosynthesis.

A second mode is referred to in the scientific literature as "electrogenerative" or "galvanic" and is characterized by the production of "byproduct" electricity along with the desired chemical product. Favorable thermodynamics ($\Delta G < 0$) are essential here, but the energy-producing aspect of this mode is desirable, e.g. in plant siting, since a nearby cheap source of electrical power is not always available.

There can be considered to be even a third mode which is intermediate between "electrolytic" and "electrogenerative". In this third mode (referred to in the literature as "voltameiotic"), the power requirements of an electrolytic process are substantially reduced but not necessarily eliminated. For example, it has been shown that the energy requirements for the electrolytic production of hydrogen from water can be significantly reduced if a carbon-containing substance is oxidized at the anode while protons are reduced to hydrogen at the cathode.

In any of these electrochemical synthesis modes, an electrocatalyst may be required for efficient operation of the electrochemical cell, i.e. the electrochemical synthesis reactor. Indeed, in the case of reduction of gaseous oxides or oxidation or reduction of organic starting materials, an electrocatalytic surface at the cathode and/or the anode may be essential for a commercially viable process. The electrocatalytic surface, of course, improves the kinetics of the electrochemical system, but improved reaction rates are not always entirely beneficial. Particularly in the case of syntheses carried out in the electrogenerative mode, it may be very difficult to control the composition of the product effluent and/or the composition of products formed in the cell electrolyte. If the sole objective were the recovery of electric power, it would be desirable for the oxidation of organic materials to proceed as far as possible, preferably all the way to carbon dioxide. (This is exactly the principle upon which organically-fueled fuel cells are based.) Similarly, the reduction of nitrogen oxides should proceed all the way to ammonia, if possible, when maximum electrical energy production is desired. However, the vast development of the chemical synthesis industry throughout much of this century has been dependent upon finding catalysts which permit the recovery of products from an intermediate stage of a thermodynamically-favored reaction. (In the "electrogenerative" mode, the oxidation or reduction is by definition thermodynamically favored.) Accordingly, the electrochemical synthesis industry also is in frequent need of electrocatalysts which accelerate reactions without causing them to proceed without selectivity. Conversely, it is important to develop electrocatalysts which are not so completely "fouled" by reactants and/or intermediate or final products as to become inactive and useless, thus necessitating a frequent and usually expensive catalyst recycling operation.

In very recent years, it has been discovered that the phenomena associated with catalyst "poisoning" can actually have beneficial aspects. Most metal catalysts are transition elements which have strong affinities for oxygen, sulfur, and nitrogen compounds, carbonyl groups, and the like. Sulfur-containing impurities in starting materials are a frequent cause of catalyst poisoning, e.g. in the petrochemical synthesis industry. Indeed, the poisoning of metal catalysts by sulfur or sulfur compounds is a serious problem in many chemical processes, and complete poisoning of a catalyst such as platinum black or supported platinum may bring the synthesis operation to a virtual halt. On the other hand, it is now known that partial poisoning of a metal catalyst will produce changes in catalytic activity without rendering the catalyst useless. In the case of conventional metal catalysts such as particulate platinum having a particle size from 500 to 1130 nanometers (on alumina), the "faceting" effects brought about by partial sulfur poisoning may be beneficial. See, for example, P. J. F. Harris, *Nature,* 323, 792–794 (October 1986). Harris was able to achieve partial poisoning of the platinum/alumina catalyst film by placing the film in contact with hydrogen sulfide in hydrogen and heating to 500° C. at which temperature the hydrogen sulfide presumably decomposes to form sulfur in situ on the catalyst surface.

T. E. Fischer et al, *J. Catal.* 53, 24 (1978) were among the first to investigate the effects of adsorbed sulfur on NO and CO adsorption and NO+CO reaction on Pt (100) single crystals. They found that a C(2×2) saturation sulfur coverage blocked NO adsorption. Lower coverages permitted NO adsorption on the free surface sites while inhibiting NO dissociation. Interpretation of these results involved both steric and electronic effects. Y. Matsumoto et al. J. C. S. Faraday I, 76, 1116 (1980) studied the effect of adsorbed sulfur on NO adsorption and dissociation on a polycrystalline Pd foil. In agreement with T. E. Fischer et al, they observed facile NO adsorption on free sites at submonolayer sulfur coverages, with NO dissociation occurring only at low sulfur coverages ($\theta < 0.3$).

Investigations of similar phenomena in the electrocatalyst field are surprisingly few, and very little is known regarding beneficial effects upon electrocatalysts obtained through a partial poisoning technique. It has been discovered by Pate et al and Langer et al that the presence of sulfur oxides does not necessarily prevent effective reduction of nitric oxide at the cathode of a hydrogen/nitric oxide electrogenerative reactor. See, for example S. H. Langer et al, *Ind. Eng. Chem Process Des. Dev.,* 22, 264 (1983); K. T. Pate et al *Environ. Sci. Technol.* 19, 371 (1985). These investigations suggest that the presence of $SO_2$ or CO in the reactor feed (Pt-black cathode) altered selectivity to favor hydroxylamine production rather than ammonia.

Given the present state of the electrocatalyst art, however, the guidelines for implementing a sulfur treatment of an electrocatalyst and for utilizing the resulting electrocatalyst material in an electrochemical synthesis catalyst are unquestionably insufficient for the development of a treatment which will provide beneficial effects rather than simple poisoning or inactivation of the electrocatalyst surface.

SUMMARY OF THE INVENTION

It has now been discovered that significant beneficial effects upon an electrocatalyst surface can be obtained by means of a treatment involving an oxidized sulfur-containing species, provided that the sulfur atoms in the oxidized sulfur-containing species have an oxidation state greater than +1 but less than +6 and provided the sulfur-containing species is chemisorbable on or by a transition metal of Group VIII or Group I-B of the Periodic Table. An important aspect of this discovery is that there are accurately controllable techniques for adjusting the coverage of the catalytic sites on the surface of the electrocatalyst, so that about 10 to 95 atomic % of the transition metal at the exposed surface of the electrocatalyst is bound to the oxidized sulfur-containing species, but at least 5 atomic % (and preferably not more than 90 atomic %) of the available surface transition metal sites are free of this sulfur-containing species. The preferred sulfur-containing species is $SO_2$. After the desired coverage of catalytic sites has been provided, the oxidized sulfur-containing species is electrochemically reduced. In the case of sulfur dioxide treatment of the electrocatalyst, the subsequent electrochemical reduction step presumably lowers the oxidation state of the $SO_2$ to about 0 or less (but not less than -2). The exact oxidation state of the reduced form of the oxidized sulfur-containing species is difficult to determine, however. The preferred technique for adjusting the coverage of the electrocatalyst surface is by means of a leaching step where the leaching solution contains dissolved oxygen. It has been found that some of the oxidized sulfur-containing species is strongly bound to the surface transition metal (and perhaps subsurface transition metal also) while some is weakly bound and is not resistant to being washed or oxidatively leached from the electrocatalyst surface through the effect of dissolved oxygen. Removal of some or all of the weakly bound sulfur-containing species has been found to be the most accurately controllable way of providing 10–95% (e.g. 30–75%) sulfur treatment of the surface transition metal electrocatalyst sites.

Accordingly, this invention broadly contemplates modifying the electrochemical characteristics of a transition-metal containing electrocatalyst, essentially at its surface, which method comprises the steps of:

(a) contacting an exposed surface of the electrocatalyst material with an oxidized sulfur-containing species which is chemisorbable on or by the transition metal and which has the structural formula:

$$S_xO_y{}^{-z}$$

where x and y are numbers from 1 to 6 and z is a number from 0 to 2, provided that y is less than 4x when z=2 and is less than 3x when z is 0, so that the average oxidation state of the sulfur atoms in the oxidized sulfur-containing species is greater than +1 but less than +6; this contacting step is carried out until the oxidized sulfur-containing species has become bound to the surface transition metal;

(b) adjusting the amount of oxidized sulfur-containing species bound to the surface transition metal to about 10 to 95 atomic % of the surface transition metal; and (c) electrochemically or (less preferably) chemically reducing the oxidized sulfur-containing species bound to the surface transition metal.

The resulting sulfur-treated electrocatalyst is useful in electrochemical cells, at the cathode and/or the anode, particularly in electrochemical cells specifically adapted for electrochemical synthesis of commercially valuable chemical products such as partially oxidized organic compounds, partially reduced oxides, and the like. Accordingly, this invention also relates to methods for partially and selectively reducing or oxidizing a starting material in an electrochemical cell which utilizes the sulfur-treated electrocatalyst.

DETAILED DESCRIPTION

The theoretical understanding of this invention is still in a very preliminary stage; moreover, this invention is not bound by any theory. Nevertheless, some tentative generalizations appear to be possible at this stage. Perhaps one of the most important theoretical questions to be addressed in connection with this invention is the difference between an electrochemical environment and a conventional heterogeneous catalyst environment. The known conventional sulfur-treated transition metal catalysts are oftentimes very sensitive and may be incapable of long-term sustained use. But in the case of the surface-modified electrocatalysts of this invention, good control over the surface modification procedure and a relatively stable, modified electrocatalyst appear to be obtainable. Among the beneficial effects provided by the surface modification technique of this invention is an improved selectivity in electrochemical synthesis operations. That is, it is possible to tailor the electrocatalyst so that it will favor the production of certain specific and highly desirable products which are at intermediate oxidation states. For example, it is possible to favor the reduction of nitric oxide to hydroxylamine with substantial suppression of other products such as nitrogen and ammonia. Although a small amount of ammonia may be produced, the degree of selectivity for hydroxylamine with a cathodic electrocatalyst of this invention is very surprising when compared to the results obtained with an untreated electrocatalyst. Similarly, oxygen can apparently be reduced to $H_2O_2$ at a cathode of this invention, and alcohols can be oxidized to esters or ketones at an anode of this invention, in which case the production of carbon dioxide as a byproduct seems to be virtually eliminated.

The reasons for the changes in electrocatalytic activity resulting from a process of surface modification carried out according to this ivnention are not fully understood. It is believed that these differences can be considered to stem from steric and mechanistic consequences of reduced-$SO_2$ coverage and alterations in the configurations of catalytic sites. For example, coverage by reduced $SO_2$ may limit adsorption on the transition metal. Another possible effect is a redefinition of the catalytic site structure so that, when a reactant is adsorbed or chemisorbed on the surface of the electrocatalyst, bond stretching and bond scission effects are altered. For example, there are data to support the conclusion that an electrocatalyst surface-modified in accordance with this invention has less tendency to stretch and/or break the NO-bond, but that other electrocatalytic functions are not lost. The NO-bond scission may require an array of surface sites or specific catalytic sites analogous to the specific surface arrays proposed for dissociative adsorptions of NO on platinum. See W. F. Banholzer et al, *Surf. Sci.*, 128, 176 (1983), and *J. Catal.*, 85, 127 (1984), Park et al, *Surf. Sci.*, 155, 341 (1985), and J. M. Gohndrone et al, *J. Catal.*, 95, 244 (1985).

Reduced $SO_2$ (e.g. sulfur or sulfide or the like) may be adsorbed randomly on the electrocatalytic surface to limit the size of specific surface arrays and thereby inhibit bond breakage. More likely, the reduced sulfur species is periodically distributed on the surface through preferential adsorption and perturbs those catalytic arrays which are active in bond scission. The reduced sulfur species might also affect the surface electronic environment in such a way that bonds such as the NO-bond are not destabilized sufficiently to be broken in the course of the reduction. Still another possible effect is the "faceting" observed by Harris and reported in *Nature*, 323, 792 (1986). Faceting can reasonably be expected to have some effect upon electrocatalytic selectivity.

Theoretical studies reported in the literature since 1978 support the conclusion that one type of surface array or ensemble is required for NO-bond scission, but free metallic sites per se may be sufficient for NO adsorption. It is therefore assumed that electrochemical reduction can still take place on free metallic sites, despite significant redefinition of the larger surface arrays needed for bond breakage, and as a result, the electrocatalytic surface can be made more selective, favoring reactions such as the reduction of NO to hydroxylamine and inhibiting to a considerable extent the reduction of NO to ammonia or nitrogen.

Although much of the foregoing discussion has centered around the reduction of oxides of nitrogen, the electrocatalytic surface modification provided by this invention is believed to have broad applicability in the field of industrial chemical production in the various electrochemical modes, including the electrogenerative mode. Because electrolytic syntheses are not dependent upon favorable thermodynamics and often require a large input of electrical energy, some selectivity is often available in the electrolytic mode by virtue of the ability to control current and voltage parameters. A similar type of control may be available in the electrogenerative mode, but the additional degree of control provided by selectivity at the surface catalytic sites may be essential for commercial viability in some electrogenerative syntheses.

The situation with respect to the partial oxidation of organic compounds would appear to be entirely different, yet the surface-modified electrocatalysts of this invention make important contributions here also. Theoretical studies have suggested that the first stage of an electrogenerative oxidation of an alcohol may be adsorption of the alcohol on the surface of the transition metal, followed by C—H bond scission and the formation of an OH-containing free radical. The next step may be the rearrangement of this free radical and the expulsion of a second hydrogen atom. In the case of a primary alcohol, this result could be summarized by saying that the alcohol is dehydrogenated to form the corresponding aldehyde.

After surface treatment of the electrocatalyst in accordance with this invention, the electrogenerative reaction mechanism seems to be significantly altered. Apparently, the OH-containing free radical is not rearranged to permit formation of a carbonyl group. This free radical remains attached to a catalytic site even after the loss of two hydrogen atoms, and while attached to the site, it is possible that the free radical reacts with a second alcohol molecule to form an ester. The net result is the same as if the primary alcohol were converted to the corresponding aldehyde and Tishchenko-type rearrangement were to take place in situ, because the result always seems to be that an alcohol of the formula $RCH_2OH$ forms an ester of the formula $R—COOCH_2R$. However, since the aldehyde intermediate may never actually appear as such and since the catalytic mechanism is entirely foreign to the Tishchenko rearrangement (presumably no alkoxide is present at any time), the alcohol/aldehyde/Tishchenko analogy is a poor one except in terms of the overall stoichiometry. The point of this analogy is to emphasize the selectivity and remarkable simplicity of overall procedures when electrocatalysis with an electrode of this invention is involved. Conventional chemistry would require at least two steps to proceed from ROH to $R—COOCH_2R$, whereas the same product can be obtained in one step through the use of this invention. Moreover, an untreated transition metal electrocatalyst, utilized in the electrogenerative mode brings about prompt release of lower aldehydes such as acetaldehyde when the anode feed material is a lower alcohol such as ethanol, but ethyl acetate was the only product observed when ethanol vapor was fed to an anode of this invention, this anode surface being relatively hydrophobic at one face and in contact with a sulfuric acid electrolyte at the other. (Oxygen was fed to the gas side of the cathode, and the cell was operated electrogeneratively.) The total ethyl acetate produced (ethyl acetate vapor effluent+ethyl acetate dissolved in the electrolyte) accounted for at least 90% of the generated current.

Returning to the question of catalytic site coverage, it has not been found that at least about 10% of the electrocatalyst treated in accordance with this invention should comprise, at least at the surface, reduced $SO_2$-containing sites, while at least 5% of the surface sites should comprise free transition metal. Stated another way, at least 10 atomic % of the transition metal sites at the surface of the electrocatalyst should be bound to the reduced sulfur species (sulfur, sulfide, or the like), but at least 5 atomic % of the surface transition metal sites must remain in the free metallic state. (In typically preferred electrocatalysts of this invention, the exposed electrocatalyst surface designed for contact with the reactant is substantially pure particles of transition metal or a carrier material such as a metallic oxide or a silicate or carbon provided with surface transition metal, hence it is reasonable to consider the entire surface to be the equivalent of a rough, porous, purely metallic surface, even though nonmetallic substances may be present, not only as carrier or support materials, but also as materials for providing a 3-way interface between reactant, transition metal and electrolyte.) When the amount of surface coverage with the reduced sulfur-containing species is less than 10%, the improvement in selectivity, if any, is insufficient to justify the effort needed to provide the surface modification treatment. On the other hand, if more than 95% of the catalytic sites have been modified, there is an insufficient remainder of adjacent and non-adjacent free metallic sites for adequate catalytic activity. The ideal coverage seems to fall within the range of 30–75% of the catalytic sites.

Redefinition of the surface by the surface modification method of this invention can be characterized by electron micrographs. However, there are other techniques which do not depend upon an accurate characterization of any alterations which may occur in the structure of the transition metal catalyst due to deposition of reduced oxidized-sulfur containing species. Two disparate methods have been used to determine surface coverage and these methods appear to provide similar results. The first method involves cyclic voltammetry. After the sulfur-containing species has been deposited on the surface and reduced (presumably to sulfur or sulfide), the resulting electrocatalyst can be run through several voltametric cycles to oxide the sulfur deposits. After several cycles (e.g. more than 10), the voltammetric traces approach a reproducible steady-state trace, presumably indicating that the sulfur deposit is completely oxidized. Current integration methodology similar to that of Loučka, *J. Electroanal. Chem.*, 31, 319 (1971) or *E. Lamy-Pitera et al, Electrochim. Acta.*, 30, 971 (1985) can then be employed. Integration of the voltammetric currents for each scan will yield the sulfur oxidation charges and sulfur surface coverages. The summation of sulfur oxidation charges over all the cycles can then be obtained and the initial sulfur coverage can be related to the hydrogen coverage by the method of Loučka. The sulfur coverage values reported in this application are thus related to the total number of available surface sites as determined by hydrogen adsorption.

The other method involves a study of limiting currents in the electrochemical reduction of nitric oxide to products such as nitrous oxide, nitrogen, hydroxylamine, and ammonia. Significant differences in the limiting currents and significantly different product mixtures are observed when an untreated cathodic electrocatalyst is compared to a cathodic electrocatalyst modified at its surface in accordance with the invention. For cells with pure nitric oxide feeds to the cathode, surface modification in accordance with this invention decreases the limiting current for nitrous oxide production by a certain percentage, suggesting a corresponding percent decrease in the free transition metal sites.

Regardless of which of the two methods is used to determine reduced sulfur species coverage of the electrocatalytic surface, preliminary indications are that the optimum surface coverage lies somewhere between about 50% and about 65 or 70%.

The best control over coverage of the electrocatalyst surface appears to be obtained by means of a procedure in which 100% or substantially 100% coverage is obtained initially, and this virtually total coverage is then adjusted to the desired level. It is possible to achieve this adjustment by electrochemical means, e.g. by oxidizing off weakly bound sulfur or the like. However, it is preferred that this adjustment be carried out by nonelectrochemical means, e.g. a chemical oxidation step using dissolved oxygen which has been found to be effective in removing weakly bound oxidized sulfur species such as $SO_2$. This procedure and other preferred aspects of this invention are described below.

THE TRANSITION METAL

A great many of the transition metals are capable of providing at least some catalytic activity. However, in the field of electrocatalysis, the range of choices is somewhat more limited because of highly corrosive environment and the like. Moreover, some transition metals appear to lack the necessary suborbital structure for maximum electrocatalytic activity. Preferred suborbital structures can be found among the elements of Group VIII and Group I-B of the Periodic Table. Of these two Groups, gold and the second and third triads of Group VIII are preferred, particularly platinum, palladium, rhodium, ruthenium and the like. Combinations of these metals have also been successfully employed in electrocatalyst systems.

Although the noble metals of Group VIII (generally considered to be the second and third triads of this Group) are very expensive, even when compared to metals such as silver and nickel, their electrocatalytic activity is outstanding, and they can be extended greatly through surface deposition on carrier materials such as metallic oxides, silica or silicates or ceramics, or elemental carbon. As is well known in the art, it is convenient to form the elemental carbon from an organic material through a carbonization process, and the carrier material (in the form of fibers, particles or the like) can be metallized in any suitable manner. See, for example, U.S. Pat. No. 4,248,682 (Lindstrom et al), issued Feb. 3, 1981.

As noted previously, the net result of all of these techniques is that the surface of the electrocatalyst which comes in contact with a reactant (such as hydrogen, oxygen, a nitrogen oxide, an organic compound or the like) can be viewed as a structurally complicated and porous but otherwise essentially pure transition metal surface in a highly activated state, even though carrier materials and the like are present, particularly in subsurface regions.

As noted above, mixtures and alloys of transition metals have been used in electrocatalysts, generally to obtain improved electrocatalytic activity and/or reduced costs.

In laboratory scale synthesis operations, where electrocatalyst cost is less important than in an industrial context, pure transition metal particles (e.g. platinum black) can be used in the preparation of the electrocatalyst material.

Some electrochemical synthesis operations (particularly but not necessarily in the electrogenerative mode) are most effective when a gas/solid electrocatalyst-/electrolyte interface can be provided. When the electrolyte is a liquid such as a strong acid or a strong base dissolved in water, this three-way interface involves a gas, a solid, and a liquid. Typically, the transition metal catalyst particles (or carrier particles or fibers metallized with transition metal) are blended with particles of a hydrophobic polymer to obtain a decreasing gradient of hydrophobicity as one approaches the electrolyte side of the catalytic electrode. Thus, a preferred electrode structure is characterized by an intense concentration of transition metal sites on one major surface and a hydrophobic layer (which may even be a pure coating of halohydrocarbon polymer) on or in closely spaced relation to the other major surface. The catalytic major surface is placed in contact with the electrolyte and permits a controlled amount of electrolyte to penetrate into the electrode and interface with chemisorbed materials on the catalytic metal surface. The face which is opposite to the face in contact with the electrolyte is sometimes referred to as the "gas" side of the electrode, since it is arranged to come in contact with a gaseous or vaporous feed material which can diffuse into the electrode structure and become at least partially adsorbed on the transition metal at the electrocatalyst surface. A very similar or even identical electrode configuration can be used in liquid/liquid systems, wherein the reactant fed to the "gas" side of the electrode is, for example, in aqueous solution rather than in the gaseous state. An important feature of this configuration (regardless of whether the feed is in the gaseous or liquid state) is its ability to accommodate continuous production of oxidized or reduced products. The starting material flows into a chamber isolated from the electrolyte by the sheet-like electrode, is oxidized or reduced at the three-way interface, and then exits as a product effluent. Mixing with the electrolyte is thereby minimized, and contact between co-reactants is often avoided altogether. For example, if one is reducing nitric oxide with hydrogen, the hydrogen can be fed to the "gas" side of the anode and the nitric oxide (or diluted nitric oxide) can be fed to the "gas" side of the cathode. The hydrogen and the NO never come in direct contact with each other, yet three hydrogen atoms (transported to the cathode as hydronium ions) can be introduced into the NO molecule to form, for example, hydroxylamine.

Similarly, when an organic compound is partially oxidized to a ketone, ester or the like, the organic compound and the oxygen do not come into contact with each other but are fed to different sides of the electrochemical cell.

Preferred halohydrocarbon polymers used to provide an electrode capable of a three-way interface include polytetrafluoroethylene (PTFE), other poly(fluorinated olefins), polytrifluorochloro ethylene, and the like.

The rapid development of fuel cell technology in the 1960's and early 1970's provided a variety of electrode structures containing exposed electrocatalyst well suited for modification and use in this invention. These electrocatalytic structures have been successfully employed in hydrogen/oxygen fuel cells, both as hydrogen anodes and as air or oxygen cathodes. It is therefore unnecessary to cite references from the very extensive patent and scientific literature regarding these electrocatalytic cathodes and anodes. Purely for illustrative purposes, one can refer to the electrodes made by American Cyanamid of Stamford, Connecticut, known as Type LAA-25 and LAA-2; see *J. Electrochem. Soc.*, 122, 1619 (1975), at page 1620. A typical assembled cell configuration is shown in *Ind. Eng. Chem. Process Des. Dev.*, 18 567 (1979), at page 568 (FIG. 1).

THE OXIDIZED SULFUR SPECIES

As noted previously, the electrocatalyst material used in the surface modification method of this invention has a strong affinity for sulfur containing compounds, provided that one or more sulfur atoms in the sulfur-containing molecule has an oxidation state less than +6. Stated another way, the average oxidation state of the sulfur atoms in the oxidized sulfur-containing species is greater than +1, but less than +6. The most preferred oxidized sulfur-containing species is sulfur dioxide, either in the gaseous state, or, more preferably, dissolved in an aqueous medium, particularly an acidic aqueous medium. The oxidized sulfur containing species can also be in the form of an anion such as sulfite ($SO_3^-$), thiosulfate, or analogs of thiosulfate such as $S_2O_4^=$, $S_6O_6^=$, etc. In this thiosulfate series of anions, at least one sulfur atom is present in the $-2$ oxidation state, hence the species is absorbable and reducible, even though one or more sulfur atoms is present in a +6 state.

Stated another way, the oxidized sulfur species can be obtained from a compound of the formula $M_2S_xO_y$, where M is preferably hydrogen but can be an alkali metal, and $S_xO_y$ is a divalent anion in which the average oxidation state of the S is +4 or less.

Most neutral oxidized sulfur-containing species having sulfur atoms with an oxidation state less than +6—with the exception, of course, of $SO_2$—tend to be very unstable and are not preferred as sulfur-treating agents in the context of this invention. Sulfur dioxide is also preferred by reason of the fact that it is stable in acidic media. Accordingly, sulfurous acid ($H_2SO_3$) can be considered to be a substantial equivalent of sulfur dioxide in the method of this invention.

When the transition metal is treated with sulfur dioxide dissolved in an aqueous acid such as sulfuric acid, only the $SO_2$ is believed to be strongly chemisorbed on the surface of the transition metal; the sulfate ions seem to be less strongly adsorbed. The $SO_2$ becomes bonded to the transition metal by at least two bonding mechanisms, hence, at least two types of bonds are formed: a wash-resistant bond, whereby the thus-bound sulfur dioxide is not substantially removed by washing or leaching with a neutral or acidic aqueous medium, and similar washes containing dissolved oxygen, and a relatively weaker bond (as compared to the wash-resistant bond), whereby this weaker-bonded $SO_2$ is substantially removable by washing or leaching with a neutral or acidic aqueous medium which seems to have no effect upon the $SO_2$ bound to the transition metal by the stronger bond. It is not known exactly how discrete these two types of bonding are. It is presently assumed, however, that the stronger bond (the "wash resistant" bond) is the result of a true chemical bonding or complexing effect. The weaker bond may be less well defined and may include a variety of physical or physico-chemical as well as purely chemical bonding mechanisms ranging from a true (but weak and reversible) chemical bond to mere physical entrapment in pores, crystalline interstices, and the like. If the weakly bound $SO_2$ is indeed chemically bonded, this chemical bond is subject to reversal when exposed to an aqueous medium containing dissolved oxygen and a very low (or nonexistent) concentration of $SO_2$. The "wash-resistant" bond, on the other hand, is not affected by such aqueous media, even over a lengthy soaking, leaching or rinsing time. Even an 18-hour soak in $SO_2$-free dilute sulfuric acid does not reverse the formation of the "wash-resistant" bond. Much longer washing may however remove it. Accordingly, the preferred soaking or oxidative leaching time is 1–50 hours at ambient temperatures (e.g. 20°–25° C.). In the preferred practice of this invention, most or all of the weakly-bound $SO_2$ is removed after the electrocatalyst has been treated with $SO_2$, so that little or none of this weakly bound $SO_2$ is present during the reduction step which converts the $SO_2$ to a reduced species such as sulfur or sulfide.

It is ordinarily not preferred to use aqueous alkaline media for the sulfur-treatment and washing steps, since it is difficult to predict the effect of basicity upon relatively acidic sulfur-containing species such as $SO_2$. Acidic aqueous media containing inert anions, on the other hand, seem to have no adverse effect either during the initial deposition of sulfur-containing species or in subsequent washing steps. As noted previously, sulfuric acid is particularly preferred for this purpose. The concentration of the sulfuric acid in these aqueous liquids (used for sulfur-containing species treatment and for washing) is variable. A 0.01 M concentration can provide considerable acidity. A concentration in excess of 12 N (6 M) appears to be unnecessary, and hence a convenient range is 0.1–3 M $H_2SO_4$.

ELECTROLYTES

Although the preferred electrolyte is sulfuric acid (preferably in a range of concentration from 0.1 to 6 M in water), many of the electrosynthesis reactions carried out with a cell prepared in accordance with this invention, are not anion-sensitive. This is true, for example, of the selective oxidation of primary alcohols to esters and the selective oxidation of secondary alcohols to ketones. Accordingly, phosphoric acid electrolytes, particularly aqueous phosphoric acids of concentrations similar to those used for sulfuric acid are well suited to use in this invention. Other acids conventionally used in fuel cells, electrolytic cells and electrogenerative cells can be used for these reactions which are not anion-sensitive. For example, perchloric acid is suitable and can be used.

It is somewhat difficult to adapt solid electrolytes for use in this invention, although solid electrolytes of the polymeric type are not precluded. Other suitable electrolytes will occur to those skilled in the art.

When concentration-cell effects are not a problem, it is permissible and even desirable to divide the electrolyte into a catholyte and an anolyte, the principal advantage being that it is then possible to utilize a relatively inexpensive counter electrode. For example, a noble metal electrocatalyst may be almost essential when one of the electrodes is in contact with the strong acid electrolyte. The membrane technology needed to divide an electrolyte into a catholyte and anolyte (without necessitating a salt bridge or the like) is well developed and need not be described in detail. Better control of the results is sometimes obtained when such membranes are used, even though the catholyte and the anolyte both comprise the same acid or base in the same concentration.

ELECTROCHEMICAL CELL CONFIGURATIONS

For operation in any electrosynthesis mode, but particularly for operation in the electrogenerative mode, an electrochemical cell constructed and arranged according to the teachings of this invention has the surface-modified electrocatalyst material at the cathode and/or the anode. An electrolyte (which can be divided into a catholyte and an anolyte, if desired) is typically in contact with one major surface each of the sheet-like cathode and anode. For research purposes, additional electrodes (such reference electrodes) may be included in the cell. The remaining major surface of the sheet-like cathode and anode is arranged for continuous contact with a flowing feed material which includes a reactant. An external circuit means connects the cathode and the anode, so that a voltage can be imposed on the cell (in the case of synthesis according to the electrolytic mode) or so that electrical energy can be recovered from the cell (in the case of the electrogenerative mode). Particularly in the case of the partial oxidation of organic starting materials, it has been found that short-circuiting of an electrogenerative synthesis cell may not be desirable and that better control of the reaction and better selectivity are obtained when current is drawn from the cell and a voltage in excess of 0.1 volts is developed in the external circuit. However, operation in a 0 voltage mode can also be used, particularly in the reduction of nitric oxide. In the electrogenerative mode, it is difficult to develop a voltage in excess of 0.9 or even a 0.7 volt and obtain the desired product. Similarly, in the electrolytic mode, it is preferred to impose on the cell a voltage within the range of 0°–0.9 volt. For convenience of description, the term $E_{cell}$ is used herein to refer to the voltage developed in the external circuit or imposed upon the cell. Particularly preferred $E_{cell}$ values are in the range of about 0.1–0.5 volt.

When operating in the electrolytic mode, only one electrode (the cathode or the anode, depending upon the type of reaction desired) need have a reaction-catalyzing electrocatalyst surface suitable for contact with a fluid reactant. In this mode of operation, the other electrode (the counterelectrode) can be designed simply to provide electrical contact with the electrolyte and can be a bright metal surface, if desired. Theoretically speaking, the oxygen cathode of a cell (where the desired reaction is an oxidation taking place at the anode) or the hydrogen anode (where the desired reaction is a reduction reaction taking place at the cathode) can be simulated by a stream of electrons supplied from an external power source electrically connected to the cell and in electrical contact with the electrolyte via a counter electrode. This theoretical proposition may be an oversimplification in the case of electrogenerative cells but is a reasonable approximation of most electrolytic systems.

PROCEDURES

As will be apparent from the foregoing disclosure, the preferred method for modifying the surface characteristics of the electrocatalyst comprises the steps of:

(a) contacting an exposed surface of the electrocatalyst with sulfur dioxide, in the presence of an acidic aqueous medium (e.g. aqueous sulfuric acid), until about 40 to about 100% of the electrocatalytically active sites at this exposed surface have been occupied by sulfur-dioxide bound to the surface transition metal by the wash-resistant bond or the relatively weaker bond described previously (and generally both types of bonding will be involved);

(b) removing substantially all of the more weakly bound sulfur dioxide by means of a soak with an oxygen-containing solution of sulfuric acid (the soaking conditions need not involve any special conditions and can be carried out at normal atmospheric pressures and room temperatures, and a 1–30 hour soak has substantially no effect upon the more strongly bound sulfur dioxide);

(c) removing the sulfuric acid solution from the exposed surface in order to recover a surface-treated electrocatalyst material having at least about 10% but no more than about 95% (preferably 30–75%) of its surface electrocatalytic sites occupied by sulfur dioxide still bound to the surface transition metal by the strong (wash-resistant) bond;

(d) after steps (a) through (c) have been completed, electrochemically or chemically reducing the strongly-bound sulfur dioxide, reduction in an electrochemical cell being preferred, electrogeneratively at an $E_{cell}$ of 0–0.9 volt, or electrolytically by applying a voltage in the range of 0.0–0.1 v. vs. RHE (reversible hydrogen electrode) to the electrode; and (e) recovering an electrocatalyst material in which 10–95%, preferably 30–75%, of the surface transition metal catalytic sites are substantially permanently occupied by a form of reduced sulfur dioxide (e.g. sulfur of valence 0 or sulfide) which is not removed by use of the electrocatalyst in a cell electrode at imposed or electrogeneratively produced cell voltages of up to about 0.9 volt.

When chemical rather than electrochemical reduction is used in step (d), above, reducing agents soluble in and substantially inert toward protic solvents (e.g. water) are preferred. Some hydrides (e.g. $NaBH_4$) satisfy this criterion.

The result of the foregoing procedure is an electrocatalyst which has been surface-modified in accordance with the teachings of this invention. Virtually all of the discussion of the modified electrocatalyst and the method for preparing it has concentrated upon chemical and electrochemical events taking place at the surface of the electrocatalyst material. This is not to say that nothing occurs in subsurface regions; indeed, it is believed that deposition of sulfur-containing species, reduction of these species, and the like can also occur in subsurface regions. The preferred electrocatalysts of this invention may in fact contain several layers of transition metal and/or modified transition metal, and these layers may be of greater than atomic dimensions in thickness. However, the most important events occur at the very surface of the electrocatalyst, hence these subsurface phenomena have not been discussed in detail.

After the weakly bound $SO_2$ or other sulfur-containing species has been removed from the electrocatalyst surface, it is generally preferred that the electrocatalytic surface be rinsed with water or a neutral aqueous medium to remove traces of the soaking medium. The washed and rinsed electrocatalyst material is then ready for electrochemical reduction. The sulfur or sulfide or other reduced species which results from the reduction step is believed to be generally uniformly distributed over the entire surface of the electrocatalyst; that is, the removal of the weakly bound sulfur-containing species takes place in a generally uniform manner across the entire surface which has been soaked and rinsed. The ultimately obtained electrocatalyst product can therefore be described as a "decorated" catalyst. The catalyst surface has transition metal atoms bound to sulfur or sulfide and the like, and adjacent or substantially adjacent to these modified transition metal sites are free, wholly metallic sites. The combination of the modified and free sites is too complex to describe in simple terms. This combination is believed to be essentially a redefined catalytic surface rather than a patchwork quilt of wholly active and wholly inactive sites.

Many methods of use for the electrocatalysts modified in accordance with this invention will occur to those skilled in the art. Several uses have already been mentioned, including partial, selective oxidation of organic compounds, selective reduction of oxides such as the nitrogen oxides, and partial reduction of $O_2$ to $H_2O_2$. A particularly preferred method of use involves the reduction of nitric oxide substantially selectively to hydroxylamine. The nitric oxide gas brought into contact with the electrocatalytic surface with the cathode of an electrochemical synthesis cell can be either pure nitric oxide or NO diluted with inert gases and the like. (Indeed, the carrier gas approach is appropriate with a variety of starting materials, including organic compounds which are to be partially oxidized.) Hydroxylamine can be recovered from the cell electrolyte and used in a subsequent chemical process or containerized for commercial use.

A better understanding of preferred procedures in and uses of this invention can be gleened from the following non-limiting Examples which illustrate electrocatalyst modification and use of the thus-modified electrocatalyst in electrogenerative synthesis.

EXAMPLES

Example 1: Preparation of Modified Electrocatalyst and Electrogenerative Cells The unmodified electrocatalyst was an American Cyanamid LAA-2 electrode sheet material which can be cut to the desired size (e.g. 5cm2) and attached to a metal screen and an electrical contact. See S. H. Langer et al, *Ind. Eng. Chem. Proc. Des. Dev.*, 22, 264–271 (1983) and S. H. Langer et al. *J. Electrochem. Soc.* 122, 1619–1626 (1975). The LAA-2 electrocatalyst sheet comprises Pt-black on the face (9 mg/cm2) and an extremely hydrophobic fluorocarbon polymer (PTFE) coating at the opposite face. The porous hydrophobic surface is designed to contact a fluid reactant and the Pt-black face is designed for contact with a liquid electrolyte such as aqueous sulfuric, phosphoric or perchloric acid. This sheet material is available with a current-collecting metal mesh already attached; the Pt-black surface is very active and well-suited to use in fuel cells and electrogenerative reactors because of its ability to permit diffusion of reactant fluids and the formation of a reactant/electrocatalyst/electrolyte interface.

The LAA-2 electrocatalyst material was modified by soaking a clean, untreated sheet (current-collecting screen already attached) in $SO_2$-saturated 1M $H_2SO_4$ overnight. After this soaking treatment, the electrocatalyst sheet was given a soaking wash in freshly prepared, aqueous 1 M $H_2SO_4$, containing dissolved air, for 18 hours, to leach out all weakly bound $SO_2$ from the electrocatalyst surface. The $SO_2$-treated and washed electrocatalyst was then subjected to a pre-reduction step (after rinsing and superficial drying) in which the electrocatalyst sheet, with an electrical lead attached to the current collecting mesh, was placed in a cell with gaseous hydrogen and kept at a constant potential of 0.0 v. vs. r.h.e. (reversible hydrogen electrode) for 0.5 hr to activate the electrode and reduce $SO_2$ in preparation for the polarization curve determination. The total geometric exposed surface on this electrode ranges from 5 to 8 $cm^2$; roughness factors are of the order of 1500 true $cm^2$/geometric $cm^2$.

Cyclic voltammetry was used to investigate the sulfur content of the electrocatalytic electrode which had been soaked, washed, activated and reduced. The cyclic voltammetry apparatus comprised a 250 ml standard high purity 3-electrode glass cell specifically modified to hold the LAA-2 electrode (2.54 cm in diameter). A Princeton Applied Research (PAR) model 175 Universal Programmer and a PAR 173 potentiostat were used in the generation and control of the electrode potential program, respectively. The electrolyte was 0.5 M $H_2SO_4$ prepared from Baker Ultrex ultrapure $H_2SO_4$ and quadruply-distilled water and was deaerated with purified nitrogen. A platinum spiral served as the counter electrode and the reference electrode was a saturated calomel electrode (SCE) filled with aqueous saturated NaCl exhibiting a constant potential of 0.264 V vs a reversible hydrogen electrode in the same electrolyte. The sulfur pretreated electrode was cycled repeatedly between 1.0 and $-0.2$ V vs SCE at 0.5 V/min and the voltammetric currents were digitally integrated using a Bascom-Turner model 4110 digital recorder. The overall sulfur oxidation charge was obtained using methodology commonly employed; see, for example, Loucka, *J. Electroanal. Chem.*, 31, 319 (1971).

For electrogenerative oxidation and reduction studies, the reduced sulfur dioxide-treated LAA-2 electrode was used as either the cathode (e.g. for NO reduction) or the anode (e.g. for alcohol oxidation) in an electrogenerative (galvanic) configuration according to S. H. Langer et al in *Ind. Eng. Chem. Proc. Des. Dev.* 22, 264 (1983) and *J. Electrochem. Soc.*, 122, 1619 (1975); see also S. H. Langer et al, Environ. Prog. 5, 276 (1985) and *Pure & Appl. Chem.*, 58, 895 (1986). The barrier electrolyte phase was 3M $H_2SO_4$ prepared from conc. $H_2SO_4$ and distilled water. Cell components were machined from KEL-F fluorochlorocarbon polymer.

When the reactant is to be reduced, it is fed as a fluid (preferably as a gas) to the cathode gas chamber where it contacts, and can diffuse into, the modified LAA-2 electrocatalyst surface. Hydrogen gas at one atmosphere is fed to the anode, which is either a treated or untreated (preferably untreated) LAA-2 electrode.

When the reactant is to be oxidized, it is fed as a fluid (preferably gaseous also) to an anode chamber containing an exposed modified LAA-2 electrocatalyst surface. Oxygen (e.g. at 1.0 atm) is fed to the cathode, which has an exposed, preferably untreated LAA-2 electrocatalyst surface. To provide alcohols to the anode in the gaseous state, an inert carrier gas (nitrogen) was passed through a saturator containing the alcohol dissolved in water.

If desired a reference electrode (e.g. a standard calomel electrode) can be included, and the electrolyte phase can be separated into a catholyte and anolyte with the aid of an ion exchange membrane. The electrodes are connected through an external circuit incorporating an ammeter and a variable resistance load (to control generated current and consequently also the electrode potential).

Thus, a typical cell configuration for reduction of nitric oxide is:

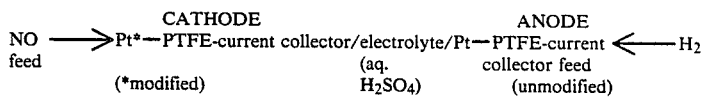

with electrical leads connected to the current collectors, external circuitry, etc.

A typical configuration for oxidation of an alcohol is:

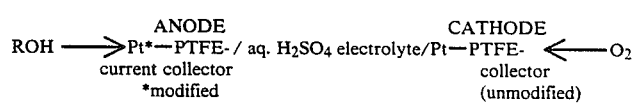

with appropriate leads, circuitry, etc.

According to the lowering of the limiting current in NO reduction at potentials below 0.6 volt, the sulfur coverage of the modified electrode was 65%. According to S-charge determination with cyclic voltammetry, the $\theta_s=0.67$ (=67% coverage), assuming a 6 electron charge (from S at zero oxidation state to S at the +6 oxidation state). The $\theta_s$ would be 0.50 (=50% coverage) if an eight electron reaction is involved, e.g. from $S^=$ to $SO_4^=$, i.e. from $-2$ to $+6$. The relatively close agreement between 67% by cyclic voltammetry and 65% by limiting current decrease seems more than coincidental; however, this invention is not bound by any theory. The "sulfur" coverage (i.e. coverage by sulfur, sulfide or some other species in a low oxidation state) appears to be periodic rather than random after the treatment has been completed.

Cyclic voltammetry studies suggest complete (100%) $SO_2$ coverage ($\theta_s=1.00$) if the washing step is omitted or if the washing solution is not exposed to oxygen. Accordingly, the strongly-bound $SO_2$ can probably be assumed to be typically in the range of from 40 or 50% up to 65 or 75% of the coverage, the balance being weakly bound-$SO_2$, which is removed in the washing step. The weakly-bound $SO_2$, in the form of a reduced sulfur species (S, sulfide, or the like), i.e. after the reduction step, appears to be the subject to re-oxidation with NO, by chemical and/or electrochemical mechanisms, perhaps leading even to its removal, leaving only the strongly-bound $SO_2$, which behaves differently and provides a reliable surface modification of electrocatalytic sites. However, chemical or physical or physicochemical, non-electrochemical techniques (e.g. washing) are preferred for removal of weakly-bound $SO_2$, so that substantially only the strongly-bound $SO_2$ is present during the reduction of the $SO_2$ to $S,S^=$or the like.

Sulfur coverage determinations were based upon a hydrogen adsorption site density of $2.04 \times 10^{18}$ H atoms/cm$^2$, the site density being based upon a calculated roughness factor (R) of 1550.

Except as otherwise indicated, electrogenerative cell operating temperatures were in the range of 15°-90° C., most typically 20°-50° C. Elevated pressures, though permissible, were not used.

Exampe 2: NO Reduction to NH$_2$OH and Byproducts

Two cathode feeds were used: (a) pure nitric oxide (CP grade) and 2.7% NO in $N_2$ (Matheson Certified Standard). Higher nitrogen oxides were removed from the cathode feeds by passing them through NaOH in acetone/dry ice. Possible reduced-NO products are determined in accordance with half-cell reactions in which the electron change per 2 moles NO can range from 2e− to 10e−and the E° vs. NHE (normal hydrogen electrode) can range from as much as 1.59 volts down to as little as 0.38 volt:

| Products | Electron (e) Change/2 mole NO | E° vs. NHE (v.) |
|---|---|---|
| $N_2O + H_2O$ | 2e | 1.59 |
| $N_2 + 2H_2O$ | 4e | 1.68 |
| $2NH_2OH$ | 6e | 0.38 |
| $2NH_3 + 2H_2O$ | 10e | 0.73 |

To measure the effect of the modification of the LAA-2 cathode with the $SO_2$ adsorption/wash/$SO_2$-reduction treatment, parallel runs were carried out with unmodified cathodes ("unmodified cell"). Current efficiency studies were carried out on both modified and unmodified cells. Current accountabilities and nitrogen balance closures were consistently within 10%.

At potentials above 0.6 volt, both modified and unmodified cells produced $N_2O$, consistent with S. H. Langer et al, op. cit. in Ind. Eng. Chem. Proc. Des. Dev. But pronounced differences were noted at cell potentials in the 0-0.6 volt range. The electrocatalyst modification method of this invention decreases limiting currents. When a cell of this invention was used with the dilute NO feed, two limiting currents were observed, one at low and one at high current. The electrocatalyst treatment decreased both limiting currents slightly and accentuated the second (higher) one.

Product analysis and current efficiency studies provided the most striking data and indicated increased selectivity for NH$_2$OH productions at $E_{cell}$ values below 0.6 volt.

Feed: Pure Nitric Oxide (5.1 cm$^3$/min)
Excess H$_2$ Fed to Anode
Exposed Electrocatalyst Surface at Cathode: 5.07cm$^2$

| | Current Efficiencies (%) at Various $E_{cell}$ Values (in Volts) | | | | | |
|---|---|---|---|---|---|---|
| Unmodified Cell Products* | 0.1 | 0.2 | 0.3 | 0.4 | 0.55 | |
| $N_2O$ | 5 | 10 | 50 | 95 | >95 | |
| $N_2$ | 17 | 22 | 28 | 12 | 5 | |
| $NH_2OH$ | 3 | 3 | 3 | <1 | — | |
| $NH_3$ | 75 | 62 | 45 | 3 | 3 | |
| Modified Cell Products** | 0.1 | 0.2 | .25 | .35 | .40 | .55 |
| $N_2O$ | — | 10 | 23 | 62 | 88 | 90 |
| $N_2$ | — | 0 | 0 | 0 | 0 | 0 |
| $NH_2OH$ | — | 75 | 48 | 22 | <5 | <1 |
| $NH_3$ | — | 15 | 23 | 18 | <5 | <1 |

*Cell internal resistance: 0.34 ohm
**Cell internal resistance: 0.26 ohm
(— indicates no data)

Example 3: Oxidation of Alcohols to Esters and Ketones

The cell configuration was as described in Example 2. The modified electrode (LAA-2, treated in accordance with Example 1), was the anode, and the cathode was an unmodified LAA-2 (9 mg/cm$^2$ of Pt-black). Available electrocatalyst surface at the anode was approximately 5 cm$^2$ as in Example 2. The cation exchange membrane dividing the electrolyte was an RAI Research 4010. The anolyte compartment was 3 mm thick, and the catholyte compartment was 4 mm thick. The cathode feed was pure oxygen at atmospheric pressure.

For an unmodified cell (see R. L. Pesselman et al, Chem. Eng. Comm. 38, 265-273 [1985]and S. H. Langer et al, Pure & Applied Chem., 58, 895-906 [1986]), the overall reaction for vaporized aqueous lower aliphatic straight-chain primary alcohols having 2 or more carbon atoms has been shown to be

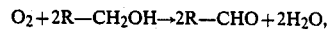
$O_2 + 2R-CH_2OH \rightarrow 2R-CHO + 2H_2O$, with some $CO_2$ and possibly RCOOH as byproducts, wherein R is $CH_3-$, $C_2H_5-$, etc.

In the modified cell, however, substantially the only reaction with a vaporized aqueous lower aliphatic straight-chain primary alcohol appeared to be

$O_2 + 2RCH_2OH \rightarrow R-COOCH_2R + 2H_2O$.

No $CO_2$ was detected. A major amount of ester was found in the gaseous effluent from the anode chamber (the "gas" side of the anode). Small amounts of ester do pass into the electrolyte, some of which is then hydrolyzed to RCOOH.

When a secondary alcohol feed is used, the overall reaction appears to be:

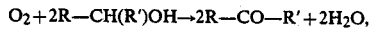
$O_2 + 2R-CH(R')OH \rightarrow 2R-CO-R' + 2H_2O$, (with little or no $CO_2$ byproduct), where R and R' are the same or different and are lower alkyl or the like. For an interesting electrolytic esterification involving substantial power input, cf. T. Shono et al, Tetrahed. Letters, 40, 3861-3864 (1979).

Apparently, limited ensembles of surface adsorption sites prevent degradation of the initially adsorbed alcohol to carbon dioxide.

Suppression of $CO_2$ formation is important in view of the relatively high cost of alcohol starting materials. Ester formation is of interest as an alternative to butane oxidation (which uses a petroleum-based feedstock instead of a biomass-based feedstock) and Fischer esterification, which is a readily reversible reaction requiring two starting materials (RCOOH and RCH$_2$OH) instead of one. The electrochemical (e.g. electrogenerative) cell configuration permits most of the ester product to be conducted away from the catalytic zone as an effluent stream before it can come into intimate contact with the acid electrolyte. The continuous distillation feature of a Fischer esterification is intended to accomplish the same objective, but permits a far greater degree of contact between ester and acid, hence a less favorable equilibrium position.

Ethanol to Ethyl Acetate

Ethanol ("EtOH") conversion to ethyl acetate ("EtAc") provided an excellent model reaction for primary alcohols (especially C$_2$-C$_{12}$ alkanols) and also has commercial significance in the chemical synthesis industry, where Fischer esterification is one of the preferred routes to ethyl acetate.

The anode feed was obtained by passing O$_2$-free nitrogen through a saturator containing 50 or 75% (v/v) ethanol dissolved in water. The anode was modified in accordance with Example 1. Cell and feed temperatures were within the range of 21.5 to 26° C. Flow to the anode was 35 to 40 cm$^3$/min.; cell internal resistance was 0.27–0.34 ohm.

The overall electrode reactions with current generation appear to be:

ANODE: $2C_2H_5OH \rightarrow CH_3COOC_2H_5 + 4H^+ + 4e$ (H$^+$ transported to cathode in the electrolyte phase)

CATHODE: $O_2 + 4H^+ + 4e \rightarrow 2H_2O$.

Some cell operating data under various conditions including steady state are presented in Table 1. For the reported polarization experiment, a stable cell potential was established well within the five minutes at each operating condition; the indicated product analyses were performed after this. Conditions were then changed to obtain the next set of data. Carle gas chromatographs with an OV-101 dimethylsilicone phase to identify acetate and additional standard columns were used for product analyses. Ethyl acetate was the only volatile product observed in the anode chamber effluent; identification was confirmed with GC/mass spectrometry on trapped effluent during steady state operation. Surface analysis on the modified LAA-2 anode using ESCA showed a sulfur-platinum surface ratio of close to 1:1. The polarization of the LAA-2 oxygen electrode is reproducible to within +15 mV and some data are shown in Table 1. These data were obtained against an isolated reference calomel electrode later calibrated against a reversible hydrogen electrode (RHE). Thus, calculations can be made for the potential at the ethanol and propanol oxidizing anode.

The data of Table 1 demonstrate significant ethyl acetate formation over a range of voltage. Washed/reduced-SO$_2$ anodes did not lose their ester forming properties even after 5 hours of operation. The small amount of ethyl acetate in the anode effluent on open circuit reflects some product accumulation in the electrolyte where it is also subject to hydrolysis.

Some ethanol vapor dissolves with ethyl acetate in the 3M sulfuric acid electrolyte during operation. The material balance improves with steady state operation (one hour) as shown in Table 1B. Within the limits of analytical error it is seen that about seventy percent of the generated current at steady state can be ascribed to ethyl acetate found in reactor effluent. Actually selectivity is greater since ethyl acetate dissolved in the electrolyte at the interface diffuses into the bulk from where much of it can be analyzed. Gas chromatographic head space analysis on the electrolyte with standards confirmed that absent product in the anode effluent is a consequence of ester dissolution; total ethyl acetate accounts for at least ninety percent of the generated current. With formation occurring under hydrolyzing conditions, minor amounts of acetic acid, identified by liquid chromatography, have been produced either directly or from hydrolysis.

TABLE 1

Electrogenerative Oxidation of Aqueous Ethanol Vapor
Polarization Experiment (T = 23° C.), EtOH Feed = 7.1 × 10$^{-5}$ mol/min in N$_2$

| Cell Voltage (IR Corrected) mV | Current Density mA/sq.cm. | EtOH × 10$^{-5}$ mol/min Product | EtAc × 10$^{-5}$ mol/min | Conversion$^g$ | % Current Accountability$^e$ |
|---|---|---|---|---|---|
| 794$^a$ | open circuit | 2.7 | 0.14 | — | — |
| 510 | 2.0 | 3.1 | 0.03 | .01 | 19.5 |
| 370$^b$ | 8.3 | 2.6 | 0.37 | .10 | 56.8 |
| 298 | 16.2 | 2.0 | 0.62 | .18 | 48.7 |
| 209$^c$ | 31.1 | 1.8 | 1.32 | .37 | 53.8 |
| 193 | 34.3 | 1.9 | 1.54 | .43 | 56.9 |
| 157 | 37.5 | 1.4 | 1.52 | .43 | 51.6 |
| 115$^d$ | 45.3 | 2.0 | 1.27 | .36 | 35.6 |
| 802 | open circuit | 1.7 | 0.16 | — | — |
| One Hour Steady State Operation$^f$ | | | | | |
| 208 (34 min) | 28.4 | 3.5 | 1.6 | .45 | 71.9 |
| 207 (45 min) | 28.2 | 3.5 | 1.5 | .43 | 69.5 |
| 201 (62 min) | 27.4 | 3.0 | 1.4 | .40 | 66.1 |

$^{a-d}$Cathode potential versus RHE values from separate experiments allow calculation of anode potential: a, 221; b, 530; c, 646; d, 725 (mV).
$^e$based on ethyl acetate in vapor product stream.
$^f$in other experiments under similar conditions analysis for acetic acid and dissolved ethyl acetate in the electrolyte brought the current accountability to close to 100 percent (within experimental error).
$^g$single pass, conversion = 2x ethyl acetate effluent molar flow in N$_2$/(ethanol molar feedflow).

With the oxygen electrode behavior characterized, an estimate of the anode potential at highest production rate for ethyl acetate is 0.66 V (vs. RHE) comparable to that for acetaldehyde at an untreated electrode.

The mechanism of ethyl acetate formation is not presently known. Although this invention is not bound by any theory, it might be explained with surface acetyl formation or diadsorbed CH$_3$OH surface intermediate. Both theories have some support in the literature. With the diadsorbed species, two protons and two electrons are presumably released in a first step, followed by attack on the diadsorbed species by an ethanol molecule, presumably resulting in ester formation and release of the other two protons and the other two electrons.

Example 4: Other Electrolytes

Example 3 was carried out with a perchloric acid electrolyte and then with a phosphoric acid electrolyte. Results were substantially the same as with the sulfuric acid electrolyte.

Example 5: Propanol Feed Materials

Example 3 was repeated, again using 3M $H_2SO_4$ electrolyte, but with 30cc/min of a 2-propanol feed (from a saturator containing 50 vol.-% aqueous 2-propanol). A similar run was carried out with 1-propanol. The 2-propanol feed provided selective acetone production with no detectible byproduct $CO_2$. When an unmodified anode was used, however, significant $CO_2$ was produced. The 1-propanol feed gave propyl propionate as the product, indicating a rather general reaction for straight-chain primary alcohols of $C_2$ and higher.

Example 6: Liquid Phase Reactant/Packed Bed Electrode

The purpose of this Example was to demonstrate liquid phase oxidation of ethanol, i-propyl alcohol and n-propyl alcohol. In all runs, the alcohol was dissolved in the anolyte (immediately before the run). In order to bring about effective contact between the aqueous alcohol/anolyte phase and the anode, various packed bed designs were used for the anode. The preferred packed bed anodes, which could be mounted inside the anode electrolyte compartment, had one of the two following configurations:

(a) Five American Cyanamid AA-1 (9 mg/cm2 Pt) electrodes with 80 U.S.-mesh tantalum screens in conjunction with a gas-diffusion electrode (of the type used in the preceeding Examples) to recover vapor phase products. The gas-diffusion electrode was either an American Cyanamid LAA-2 (9 mg/cm² Pt) or an LSE graphite electrode.

(b) Platinum supported on either graphite felt or porous graphite sheet, with no gas-diffusion electrode associated with the packed bed. The oxygen counter-electrode was an American Cyanamid LAA-2, described in the previous Examples.

Electrolyte Flow System

The anolyte containing dissolved alcohol reactant flowed from a 1-liter reservoir into the cell through a three-way stopcock at the bottom of the anode electrolyte chamber. The stopcock facilitated draining the anolyte after the experiment was finished. The anolyte exited the cell through a "Teflon" (PTFE)/glass needle valve which was used to control the flowrate. Anolyte flowrate was determined by measuring with a stopwatch the time necessary to collect 5-10 ml in the graduated cylinder. Anolyte product samples were also collected in this manner.

Static catholyte was employed in all experiments. Excess catholyte was maintained in two catholyte reservoirs (drying bulbs) connected to top and bottom nipples of the cathode electrolyte chamber.

Gas Flow System

In all experiments excess oxygen was fed to the cathode. In the case of the AA-1 packed bed (packed bed "a"), nitrogen was passed over the anode LAA-2 or LSE to recover vapor or gaseous products. In the experiments with the Pt/graphite packed bed (Packed bed "b"), no gas diffusion electrode was used with the packed bed; thus there was no anode gas stream.

Electrode Pretreatment

In experiments involving the AA-1 packed bed, hydrogen gas was passed over the gas diffusion electrodes at the anode and cathode, while the cell was shorted for thirty minutes. After this time, the resistance across the unshorted cell was measured with a Keithley model 502 milliohmmeter.

In experiments involving the Pt/graphite packed bed, since no gas diffusion electrode was employed at the anode, a different pre-treatment procedure was developed. Here, a constant current supply in series with an ammeter was connected across the cell. Also connected across the cell was a voltmeter. The current source (neative terminal connected to anode) was adjusted to force about 10ma through the cell, while hydrogen gas was fed to the cathode. A slight production of hydrogen gas bubbles at the packed bed anode was observed. Reduction was maintained under these conditions for about one hour; the cell resistance was then measured as above.

Experimental Procedures

In all runs, two polarization curves were performed for each set of experimental conditions. In the first curve, cell potential was changed every four minutes. In the second curve, cell potential was varied every five minutes and gas chromatography (GC) analyses of the anode effluent gas (in cases where a gas diffusion electrode was present at the anode) were performed at the end of each 5 min. period. Steady state experiments were also carried out. Here, after the two polarization curves were finished, the cell potential was adjusted to a region of interest and allowed to reach steady operation for about 25 minutes. After this period, GC samples of the anode effluent vapor were analyzed (in experiments where a gas diffusion electrode was present at the anode) while a 5-10 ml sample of the anolyte effluent was obtained. This anolyte sample was immediately analyzed using headspace chromatography. Other steady state potentials were then investigated using the same procedure. The anolyte samples were analyzed by HPLC (high performance liquid chromatography) the day after each experiment.

Chemical Analyses

Gas chromatographic analysis of the anode effluent vapor was accomplished on Carbowax 1540 ($C_2H_5OH$, $CH_3CHO$, $C_2H_5OCOCH_3$, i-propyl alcohol, acetone), Porapak-Q ($CO_2$) and OV-101 silicone (n-propyl alcohol, n-propyl propionate) columns. Headspace analysis was performed using the same columns. In this procedure, a small (500 $\mu$l) sample of the anolyte effluent was placed in a 50 ml sealed ("Teflon" Mininert valve) vial and allowed to equilibrate for 10-20 minutes before a sample of the vapor above it was analyzed by gas chromatography. Calibration curves of several liquid standards bracketing the sample vapor concentrations were performed the same day as the electrogenerative experiment.

The anolyte was also analyzed with HPLC for acetic (ethanol runs) and propionic (propanol runs) acids using a derivative technique based on esterification with phenacyl bromide.

Run Summary

Anolyte flow rates (cm3/min): from 0.4 to 2.3.
Concentration of alcohol in feed: from 0.25 to 1.0 M.
Internal cell resistance (ohms): from 0.27 to 0.45.
Steady state cell potential (mV): from 188 to 295, with current densities above 5mA/cm$^2$ and up to about 60 mA/cm$^2$.

When the AA-1 packed beds (type "a", above) were not modified in accordance with this invention and the feed was ethanol, typically at least about 1% of the current was attributed to $CO_2$ production, the major amount of current (about 50–90%) could be attributed to acetaldehyde, and a minor amount of current was accounted for by acetic acid. With reduced —$SO_2$ treated AA-1 packed bed anodes, on the other hand, no $CO_2$ whatever could be detected, about 60–75% of the current was accounted for by acetic acid, and no acetaldehyde was detected.

In runs with reduced $SO_2$-modified AA-1 (type "a") packed bed anodes and 0.5 M i-propyl alcohol or 0.5 M n-propyl alcohol feeds, no $CO_2$ was detected. In the case of i-propyl alcohol, the sole product produced appeared to be acetone, and in the case of n-propyl alcohol, no propionaldehyde was detected, but 57–82% of the current could be accounted for by propionic acid production.

In type "b" (Pt/graphite sheet) experiments, wherein no gas-phase products were recovered with a nitrogen gas stream, the amount of carboxylic acid production was increased relative to the aldehyde production, even without S-treatment; however, the effect of the reduced-$SO_2$ treatment is to provide a still higher proportion of carboxylic acid.

Ambient temperature (20°–25° C.) and pressure (atmospheric) conditions were used in all of the foregoing Examples, but these processes are operative over a broader range, e.g. temperatures of 15°–90° C..

What is claimed is:

1. A method for partially and selectively oxidizing an alcohol to an ester or carboxylic acid with suppression of $CO_2$— and aldehyde-formation, in an electrochemical cell comprising a cathode, an anode, an electrolyte in contact with the cathode, and the same or a different electrolyte in contact with the anode, comprising the steps of:

bringing a alcohol into contact with a surface of said anode, said surface of the anode comprising a transition metal of Group VIII or Group I-B of the Periodic Table, 10–95 atomic % of which, at said surface, is bound to a reduced form of a sulfur-containing species which is chemisorbable on or by said transition metal and which has the structural formula $$S_xO_y^{-z}$$

p where x and y are numbers from 1 to 6 and z is a number from 0 to 2, provided that y is >4x when z=2 and is <3x when z is 0, so that the average oxidation state of the S atoms in said sulfur-containing species is greater than +1 but less than +6 prior to reduction, and is <+1 after reduction, said reduced form being resistant to removal by leaching or washing with oxygen-containing neutral or acidic media and being resistant to removal by electrochemical means at an $E_{cell}$ voltage in the range of 0 to 0.9 volt;

operating said cell electrogeneratively at an $E_{cell}$ voltage of about 0.1 to about 0.5 volt; and recovering the resulting ester or carboxylic acid and electrical energy from said cell.

2. A method according to claim 1, wherein said alcohol has the formula $RCH_2OH$, R being an aliphatic radical, and wherein the principal product is R—$COOCH_2R$ or RCOOH.

3. A method according to claim 2, wherein R is methyl or ethyl.

4. A method according to claim 3, wherein the alcohol is in a gaseous state when brought into contact with the surface of said anode, and the principal product is R—$COOCH_2R$.

5. A method according to claim 3, wherein the alcohol is in aqueous solution when brought into contact with the surface of said anode, and the principal product is RCOOH.

6. A method for partially and selectively oxidizing an alcohol of the formula $RCH_2OH$ to an ester of the formula $RCOOCH_2R$, R being an aliphatic radical, in an electrochemical cell comprising a cathode, an anode, an electrolyte in contact with the cathode, the same or a different electrolyte in contact with the anode, and circuit means external to the cell connecting the cathode and anode, said method comprising:

bringing the alcohol into contact with a surface of said anode, said surface of the anode comprising a transition metal of Group VIII or Group I-B of the Periodic Table, which transition metal at said surface of the anode is, at least in part, bound to a sulfur-containing species;

operating said cell electrogeneratively at an $E_{cell}$ voltage of about 0.1 to about 0.5 volts, whereby there occurs the overall chemical reaction $$O_2 + RCH_2OH \rightarrow R-COOCH_2R + 2H_2O$$

and electrical energy is produced by the cell.

7. A method according to claim 6, wherein R is methyl or ethyl.

* * * * *